United States Patent
Ortgiese et al.

(10) Patent No.: US 8,224,676 B2
(45) Date of Patent: Jul. 17, 2012

(54) ON-DEMAND FLIGHT ACCIDENT INSURANCE

(75) Inventors: Jens Ortgiese, Stuttgart (DE); Zoltan Kastner, Goeppingen (DE); Philip M. Douglas, Bad Soden (DE); Alistair J. Forbes, Koenigstein (DE); Daniel Bauer, Decatur, GA (US)

(73) Assignee: Flightsurance GmbH, Frankfurt am Main (DE)

( * ) Notice: Subject to any disclaimer, the term of this patent is extended or adjusted under 35 U.S.C. 154(b) by 580 days.

(21) Appl. No.: 12/541,361

(22) Filed: Aug. 14, 2009

(65) Prior Publication Data
US 2010/0049553 A1      Feb. 25, 2010

Related U.S. Application Data

(60) Provisional application No. 61/091,448, filed on Aug. 25, 2008.

(51) Int. Cl.
*G06Q 40/00*      (2012.01)
(52) U.S. Cl. ............................................ 705/4
(58) Field of Classification Search ................ 705/4
See application file for complete search history.

(56) References Cited

U.S. PATENT DOCUMENTS

| | | | |
|---|---|---|---|
| 4,203,620 A | 5/1980 | Long | |
| 5,797,134 A | 8/1998 | McMillan et al. | |
| 6,645,718 B2 | 11/2003 | Liu et al. | |
| 7,010,494 B2 | 3/2006 | Etzioni | |
| 7,234,640 B2 | 6/2007 | Pentel | |
| 7,324,950 B2 | 1/2008 | Sherman | |
| 2004/0010426 A1* | 1/2004 | Berdou | 705/4 |
| 2006/0100912 A1 | 5/2006 | Kumar | |
| 2006/0112103 A1* | 5/2006 | Besserman et al. | 707/10 |
| 2007/0143154 A1 | 6/2007 | Ashby et al. | |
| 2007/0219831 A1 | 9/2007 | Ne'meth | |
| 2008/0167903 A1 | 7/2008 | Hall | |

FOREIGN PATENT DOCUMENTS

| | | |
|---|---|---|
| CN | 1591500 | 3/2005 |
| DE | 19916702 | 11/2000 |
| KR | 2002/013152 A | 2/2002 |

OTHER PUBLICATIONS

PCT International Search Report for PCT/US2009/053892, "On-Demand Flight Accident Insurance", KIPO, Feb. 24, 2010.
PCT International International Preliminary Report on Patentability for PCT/US2009/053892, "On-Demand Flight Accident Insurance", KIPO, Mar. 1, 2011.
"Global Travel Shield Classic Plan Summary" web page, underwritten by AMEX Assurance Company, Green Bay, WI, Jul. 28, 2008.
AON "Risk Bulletin", Issue 84, Aon Limited, Jun. 23, 2005.

(Continued)

*Primary Examiner* — Neal Sereboff
(74) *Attorney, Agent, or Firm* — Mark Nowotarski

(57) ABSTRACT

A system for providing flight accident insurance at low price and fixed coverage comprises means for limiting the number of policies that can be sold on any given flight to not more than a predetermined number. The predetermined number may be 20. The premium for the insurance is a function of the GDP of the country in which the airline operating said flight is domiciled such that said premium is a decreasing function of said GDP.

15 Claims, 7 Drawing Sheets

OTHER PUBLICATIONS

"Aviation Pricing and Modelling Care Meeting" power point presentation, 2006.

V.K. Rohatgi, "Statistical Inference", book shot, Wiley, New York, NY, 1984.

"Flight Insurance, (refer to product No. 007718)", pamplet, AIG, New York, NY, May 16, 2006.

"Global Travel Shield", web page, underwritten by AMEX Assurance, copyright 2002, Apr. 18, 2008.

Hogarth, Robin and Kunreuther, Howard, "Pricing Insurance and Warranties; Ambiguity and Correlated Risk", The Geneva Papers on Risk and Insurance Theory, 17:1 36-60, The Geneva Association, 1992.

"Insurance", web page, Civil Aviation Authority, Apr. 23, 2008.

"Regulation (EC) No. 785/2004 on Insurance Requirements for Air Carriers and Aircraft Operators", Apr. 20, 2005.

Morrison, Steve A., "Why Airplanes Crash: Aviation Safety in a Changing World", Journal of Economic Literature, vol. 32, No. 1 pp. 164-166, Mar. 1994.

Sniffen, Michael J., "No Deaths in 2007 Accidents on Scheduled US Airlines", Copyright 2008, The Associated Press, Apr. 16, 2008.

"Accidents Involving Passengers Fatalites, US Airlines (Part 121) 1982-Present", web page, NTSB, Apr. 23, 2008.

Phillips, James T., "The Korean War Hazard" Transactions of Society of Actuaries 1953 vol. 5 No. 11, Mar. 1953.

"Americans Spend More Than $1 Billion a Year on Travel Insurance", UStiA Press, US Travel Insurance Association, May 25, 2005.

Aunon-Nerin, Daniel & Ehling, Paul, "Why Firms Purchase Property Insurance?", Swiss Finance Institute Research Paper Series No. 07-16, National Centre of Competence in Research Financial Valuation and Risk Management, Geneva, Switzerland, May 2007.

Salam, Romel, "Estimating the Cost of Commericial Airlines Catastrophes—A Stochastic Simulation Approach", Mar. 4, 2003.

"Dear Traveler,..", pamphlet, Travelex Insurance Services, Dec. 13, 2006.

"Get a Quote", web page, Travelex Insurance Services, Apr. 15, 2008.

"TraveLite; Flight Accident", web page, Travelex Insurance Services, Apr. 15, 2008.

"Before You Leave Home, Consider the Unexpected", pamplet, Travelex Insurance Services, Feb. 25, 2008.

Visser, H.C, "If I Were A Rich Man . . . , . . . My Accident Record Wouldn't Be So Bad", Aviation Safety, pp. 365-383, H. Sockkha (Ed) VSP, 1997.

Windecker, Arthur A., "Discussion of Papers Presented at the Spring Meetings, The Korean War Hazard James T. Phillips", Transactions of Society of Actuaries, vol. 5 No. 13, 1953.

Lu, Chien-Tsung, Wetmore, Michael & Przetak, Robert, "Another Approach to Enhance Airline Safety; Using Management Safety Tools", Journal of Air Transportation, vol. 11, No. 1-2006.

* cited by examiner

Fig. 1B (Present Invention)

Manual Input by customer
300

Fight 1:

| Departing | Leaving from: | Time | Going to | Time | Airline | Flight number |
|---|---|---|---|---|---|---|
| 15.08.08 | SAN | 07:40 | JFK | 15:45 | AA | 160 ← 302 |

Fight 2:

| Departing | Leaving from: | Time | Going to | Time | Airline | Flight number |
|---|---|---|---|---|---|---|
| 15.08.08 | JFK | 18:15 | LHR | 06:45 | AA | 100 |

Fight 3:

| Departing | Leaving from: | Time | Going to | Time | Airline | Flight number |
|---|---|---|---|---|---|---|
| 16.08.08 | LHR | 08:10 | STR | 10:45 | AA | 3535 |

Fight 4:

| Departing | Leaving from: | Time | Going to | Time | Airline | Flight number |
|---|---|---|---|---|---|---|
|  |  |  |  |  |  |  |

Fig. 3

ON-DEMAND FLIGHT ACCIDENT INSURANCE

CROSS REFERENCE TO RELATED APPLICATION

This patent application claims the benefit of U.S. provisional patent application "On-Demand Flight Accident Insurance", U.S. Ser. No. 61/091,448, filed Aug. 25, 2008. Said application is incorporated herein by reference.

COPYRIGHT AND TRADEMARK NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

The airplane logo shown as item 510 in FIG. 5 is a trademark of Flightsurance Gmbh.

BACKGROUND

There is a long felt need for affordable flight accident insurance to cover the risk of accidental death, injury, and/or dismemberment caused by an airline accident, such as a crash. Passengers need to be covered while boarding an aircraft, traveling on said aircraft, and deplaning from said aircraft.

As currently offered, however, flight accident insurance is very costly. Typical premiums for a one way flight are $50 per flight for $1,000,000 coverage. Additionally, many insurance carriers limit their exposure to $10,000,000 per incident for all insureds. If a flight had 20 insureds on board and all 20 perished in an accident, their beneficiaries would only get $500,000 each ($10,000,000/20) instead of the full $1,000,000 of coverage listed on the policy. In an extreme case where a full jumbo jet had 300 insureds on board, their beneficiaries would only receive $3,333 each ($10,000,000/300).

The primary reason for insurance companies limiting their total exposure per flight is the cost of reinsuring the "catastrophic risk" associated with the very rare event of a flight crashing with a large number of insureds on board. If there were roughly 10 million flights per year and roughly 10 million flight accident insurance policies sold, then the average number of insured persons on any given flight would be 1. If these persons were randomly distributed, then some flights might have 2 or 3 insureds and some wouldn't have any. The probability of any flight having 10, 20 or more insureds would be exceptionally small.

Insured persons, however, are not distributed randomly. A family, sports team, or other group of people may purchase flight accident insurance as a group. Hence some flights might have exceptionally large numbers of insureds on board. If one of these flights were to crash, then the insurance company's exposure would be very large. Hence insurance companies must limit their exposure and charge a very large premium to cover the catastrophic risk of a flight with a large number of insureds on board crashing.

Limiting coverage to a fixed amount for all insureds on board, however, is misleading to the individual insureds that buy coverage. Each one thinks that he or she is purchasing $1,000,000 in coverage, but in fact, that coverage may be dramatically less if a large number of fellow passengers are similarly insured and there is no way for an insured to know how many others on board are insured. Hence there is a long felt need for low cost flight accident insurance with a benefit that insureds and their beneficiaries can count on irrespective of how many other insureds are on board.

SUMMARY OF THE INVENTION

The Summary of the Invention is provided as a guide to understanding the invention. It does not necessarily describe the most generic embodiment of the invention or all species of the invention disclosed herein.

FIG. 1 compares the prior art (FIG. 1A) with an embodiment of the present invention (FIG. 1B). FIG. 1A illustrates the prior art where a large number of insureds 104 are on the same flight 102. Each believes that they have full coverage when, in fact, their coverage is diluted by the other insured passengers on the same flight. The maximum number of insureds may be the full capacity of the plane (e.g. 300).

FIG. 1B illustrates the present invention where the maximum number of insureds 114 covered by a given insurance company, on a given flight 112, is limited to a small number, such as 20. By limiting the number of insureds, each insured is guaranteed to get full coverage in case of an accident and the insurance company does not have to charge enough premium to cover a crash of a full plane load of insureds. Thus said insureds can be confident that, in the case of tragedy, the beneficiaries of their policies will get the full coverage they purchased. (The beneficiary of a policy may include an insured in case of injury of the insured and not death.)

BRIEF DESCRIPTION OF FIGURES

FIGS. 1A and 1B show a comparison of the prior art and the current invention.

FIG. 3 is an exemplary web page for manual input of application information.

DETAILED DESCRIPTION

Persons of ordinary skill in the art will recognize that the following disclosure is illustrative only and not in any way limiting. Other embodiments of the invention will readily suggest themselves to such skilled persons having the benefit of this disclosure. For example, a person of ordinary skill in the art would understand that the actions attributed to any given entity may in fact be carried out by one or more separate entities under the employ or direction of said given entity.

Insurance Purchasing Process

Figure 1A:
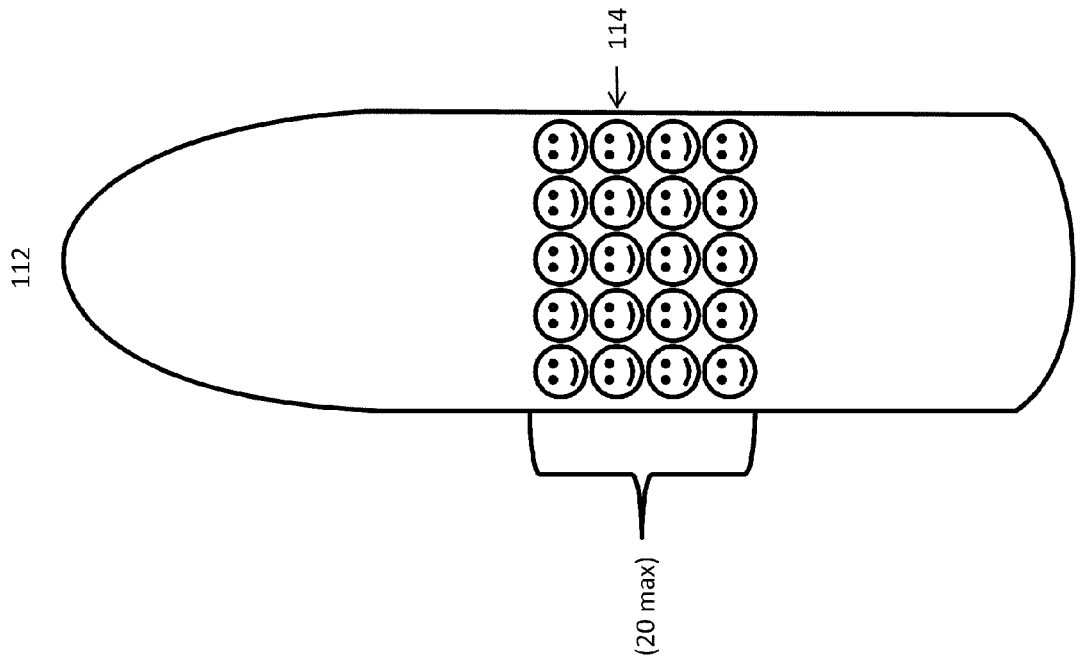
Figure 1A:
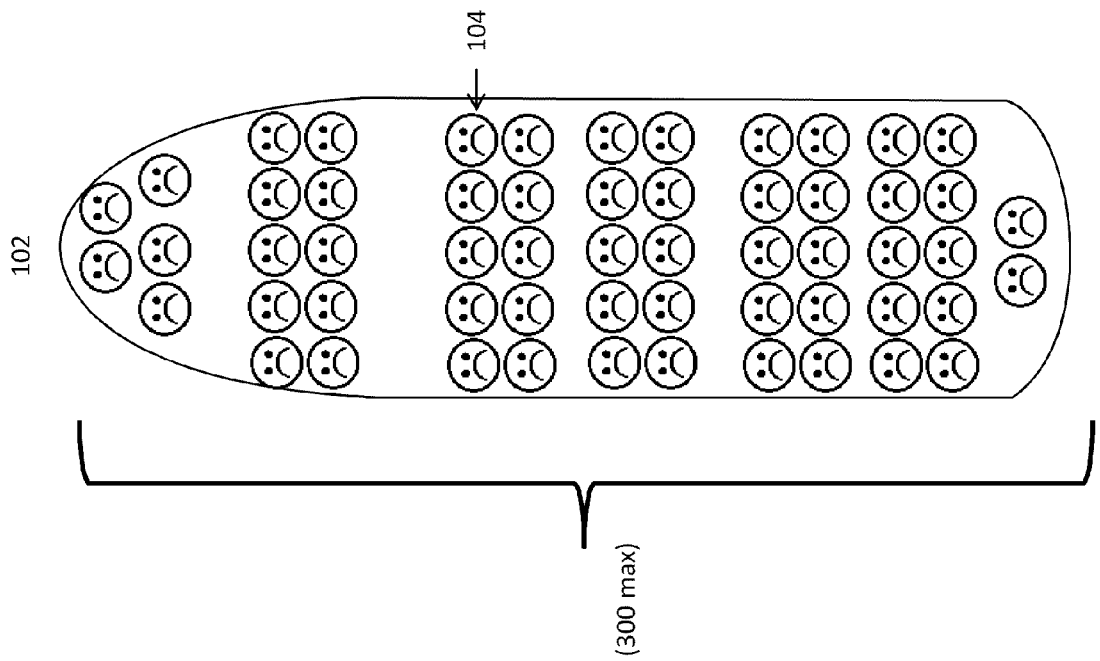
Figure 2:
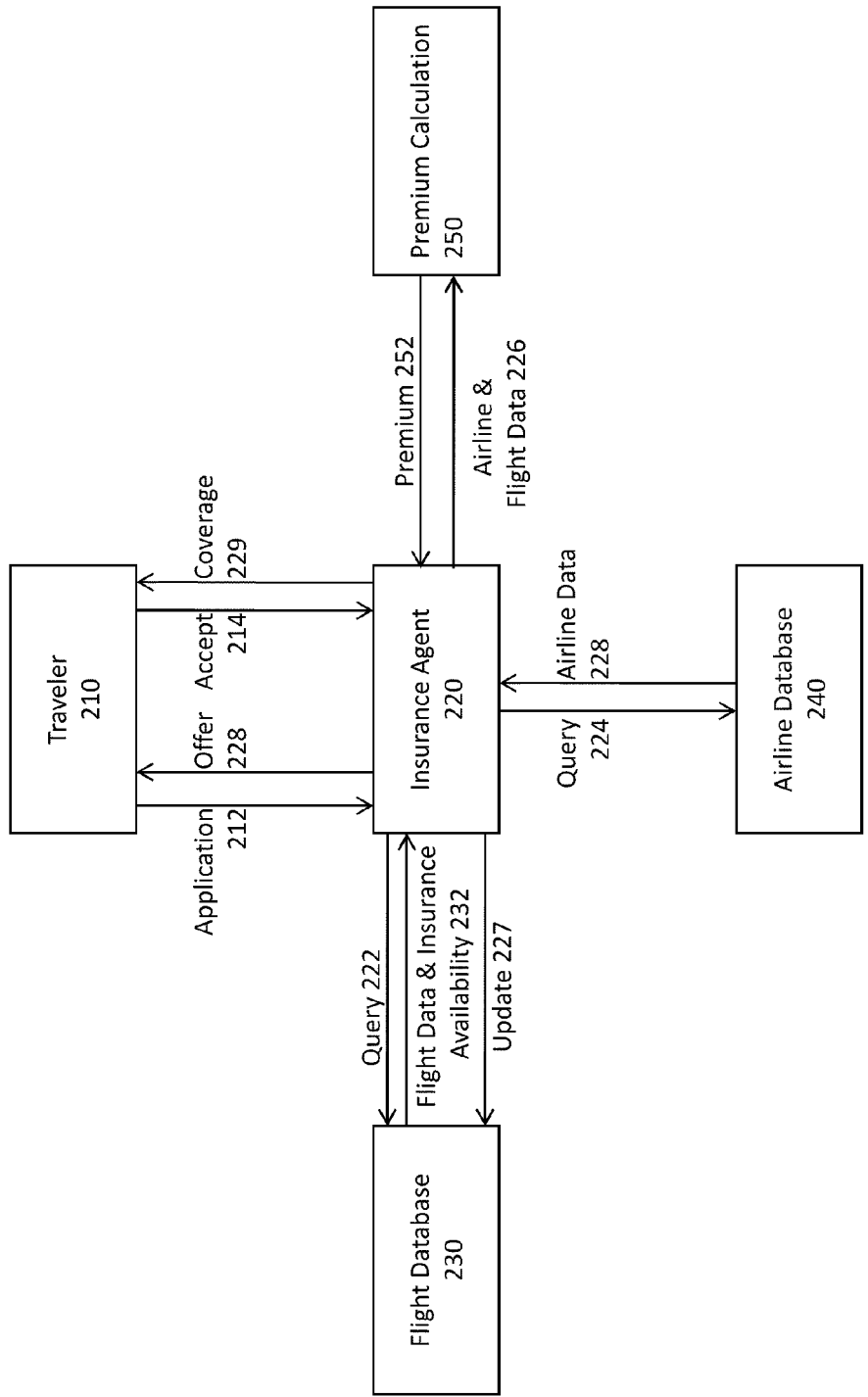
FIG. 2 is a schematic of a system for performing the methods of the current invention.

FIG. 2 illustrates the technology-enabled information flow 200 between entities when flight accident insurance, according to the present invention, is purchased.

An insurance agent 220 receives from a traveler 210 an application 212 for flight accident insurance. The insurance agent may be an independent agent or broker (e.g. Flightsurance GmbH), a captive agent of the insurance company underwriting the flight accident insurance (e.g. QBE), a travel agency authorized to act on behalf of said insurance company (e.g. easyJet.com), a web site, such as expedia.com, or other entity which is similarly authorized to offer, underwrite, receive payment for, and issue (or "bind") said insurance coverage.

The application comprises information about the insured, such as name, and information about the flight, such as flight number, departure time, travel dates, airline, departure and destination airport, etc.

The insurance agent then queries 222 a flight database 230 to determine if there are one or more insurance policies available for the flight in question. The database comprises flight identification information, airline partners, and the number of flight accident insurance policies already sold and/or remaining to be sold.

A given flight may have multiple airline-flight number designations due to the fact that multiple airline partners may offer the same flight under their own brand. Under a code sharing agreement, the airline that actually operates the flight (the one providing the plane, the crew and the ground handling services) is called the operating carrier. The company or companies that sell tickets for that flight but do not actually operate it are called marketing carriers or validating carriers. The flight database, therefore, comprises a list of all of the different designations of a given flight to reduce the chance of exceeding the allowable number of insurance policies sold. Occasionally, the flight data received does not indicate that a given flight is offered by multiple airlines, when it fact it is. A check is done, therefore, to identify flights offered by different carriers in the same alliance where the flights have the same origin, the same destination and scheduled departure times within a certain window of time. Flights with different designations that meet these criteria are considered to be the same flight and the total count of insurance policies sold for said flight is set to the sum of the number of policies sold through each carrier. A suitable window of time is 5 minutes. The time period can be as low as one minute. Time periods of less than a minute tend to falsely indicate that two flights are different, when in fact they are the same. Time periods as high as 30 minutes can be used. Time periods greater than 30 minutes tend to falsely indicate that two fights are the same, when in fact they are different.

The insurance agent then receives 232 flight data and insurance availability data from said flight database indicating whether or not additional insurance policies may be sold for the flight the traveler inquired about. If none are available, then the insurance agent informs the traveler and the transaction concludes without the insurance being offered.

If there are policies available, however, the insurance agent then queries 224 an airline database 240 to retrieve 228 airline data regarding the airline, accident history, maintenance evaluation and other parameters that can be used to calculate a Risk Premium of said flight. "Risk Premium", as used herein, refers to the portion of an insurance premium that is required to pay out expected claims. Risk Premiums typically represent about 40%-60% of the total premium charged for a property and casualty insurance product. The balance of the premium comprises fixed costs, variable costs, commissions, and profit.

The insurance agent then passes the airline and flight data 226 on to a premium calculation engine 250 that calculates a quote for the premium for said flight.

The insurance agent then receives 252 the premium quote and makes an offer 228 to the traveler. If the traveler desires the coverage, then the insurance agent receives 214 an acceptance, which may include payment of the premium. The agent then issues coverage 229 on behalf of the insurance carrier or coverage is issued directly by the insurance carrier.

After coverage is issued, the insurance agent then updates 227 the flight database to indicate that one or more additional policies have been purchased for the flight in question. Thus, when the present insurance agent, or another insurance agent authorized to sell said insurance, queries the database in the future, an accurate indication of insurance availability will be available.

The entire transaction is preferably carried out in real time, similar to the speed at which an airline reservation may be made on-line. Methods similar to on-line booking engines are employed to reduce the chance of accidental over selling of insurance policies due to multiple parties querying the flight database at the same time (e.g. within the time it takes to confirm availability and conclude a transaction.)

If a traveler has more than one flight in his or her itinerary, then the agent checks the availability of insurance coverage for all flights on the itinerary. If all flights are available, then insurance coverage is offered. If not, then no offer is made. The entire pricing and approval process occurs in real time.

Receiving Application Information

FIGS. 3, 4, 5, and 6 illustrate alternative technologies by which an insurance agent can receive application information from a traveler.

FIG. 3 shows a view of a web page 300 whereby a traveler manually inputs 302 flight information for one or more flights that he or she wishes to purchase insurance coverage for. The web page may be presented on a work station in communication with the Internet. The traveler enters the information and then hits a "send" button to forward the information to the agent. It can also be forwarded to the insurer.

Figure 4:
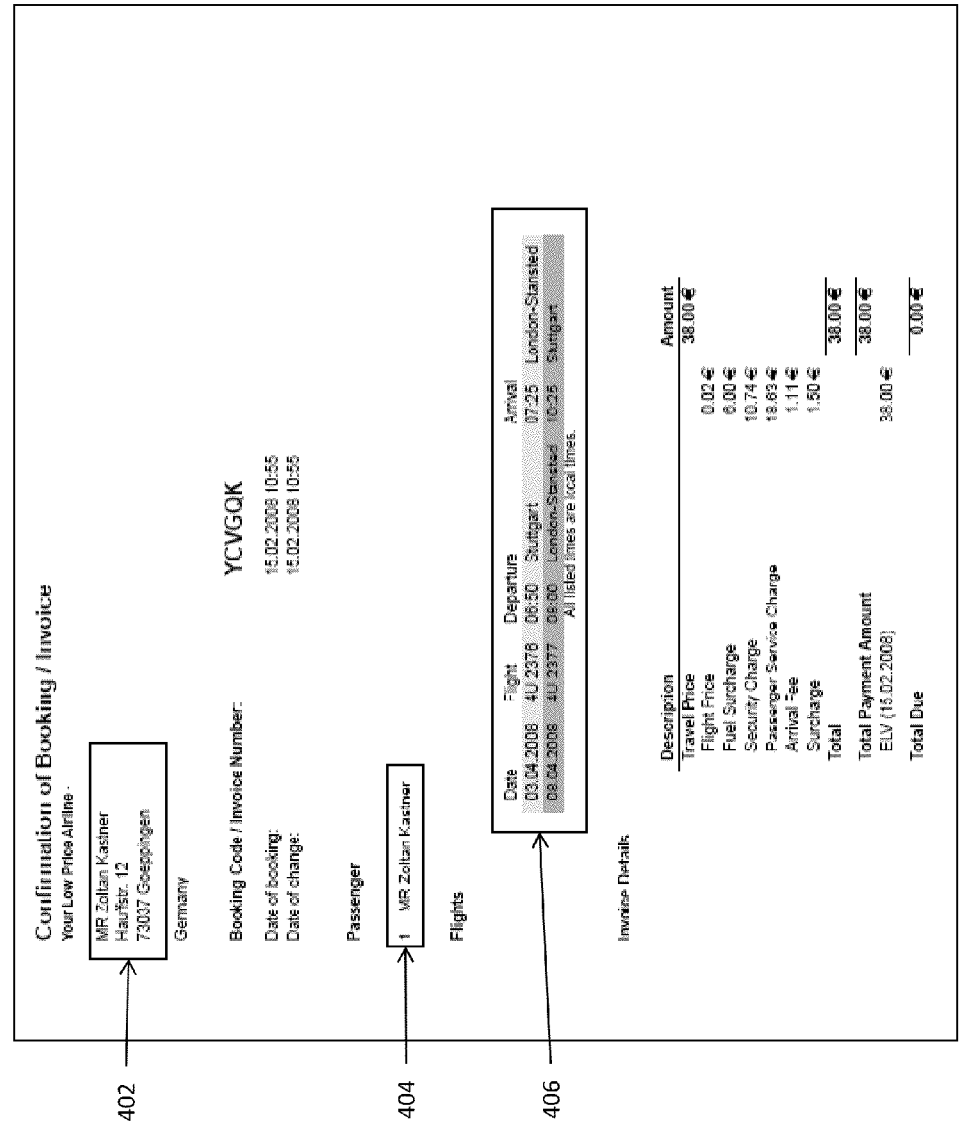
FIG. 4 illustrates the use of a crawler to get application information from an email travel itinerary.

FIG. 4 illustrates a travel confirmation email 400 that may be forwarded to an agent by a traveler applying for coverage. The agent employs an email crawler to review the email and automatically identify and record the pertinent application information. The information includes the address of the traveler 402, traveler's name 404 and flight information 406. This method has the advantage of reducing the effort required by the traveler to apply for coverage but still allows the traveler to use his or her normal travel agent.

Figure 5:
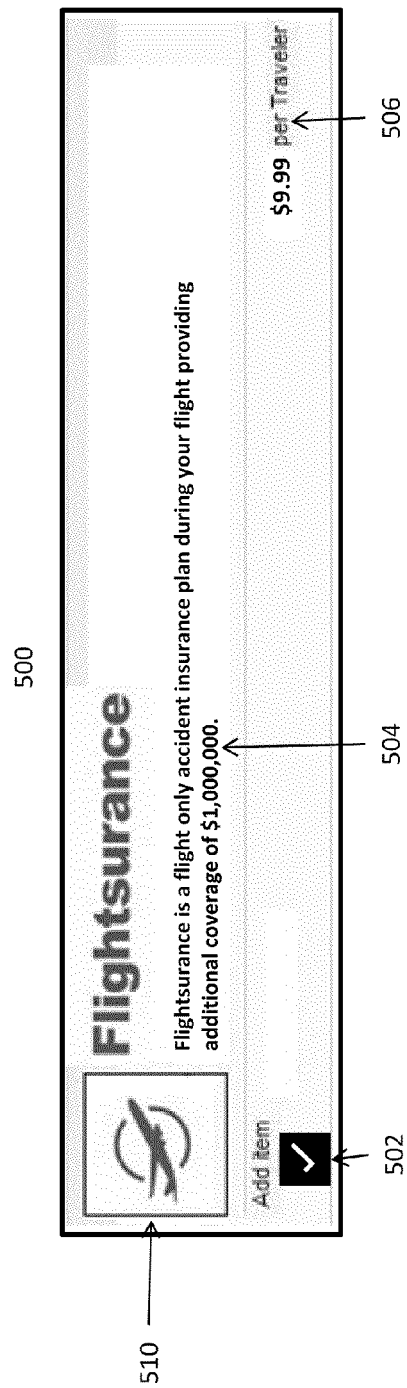
FIG. 5 illustrates "+1 Click" purchasing of flight accident insurance.

FIG. 5 illustrates a "+1 Click" option 500 that allows a traveler to indicate his or her desire to apply for flight accident insurance through an online travel booking service, such as expedia.com. The traveler applies merely by clicking 502 an "add item" box in the offer after they have input their flight, personal and payment information into the travel booking service. Some jurisdictions, such as Germany, may require two clicks. A first click may be required to indicate the desire to apply for coverage and a second click may be required to indicate acceptance of terms and conditions.

The offer may comprise a brief description of the coverage 504 that may be hyperlinked to a more complete description of the terms of coverage. It may also present a price quote 506 for the coverage. After the traveler has indicated his or her desire to apply for the coverage, the agent receives the appropriate information from the travel booking service and binds the coverage.

There are a number of ways to integrate the product into a booking service. These include:

Fully integrated: Insurance is fully integrated into a booking process using XML interface. The airline/travel agency collects money and is reconciled with the insurance agent and/or insurance company every month.

Partially integrated: Insurance is integrated into a booking process. An end user (e.g. traveler) is shown the price. The transaction+payment is completed by the insurance agent. During booking, complete data is passed to the insurance agent including all flight details and payment information. The insurance agent processes payment+ sends a confirmation to the customer.

Linked: A link is provided from a booking confirmation page. If the user clicks on the link, he or she is transferred to the insurance agent's website with as much data as possible pre-filled. The user enters his or her credit card number and completes the transaction. The insurance agent collects funds via a payment gateway, like wirecard (wirecard.com) and pays commissions, such as those to the airline, monthly.

Figure 6:
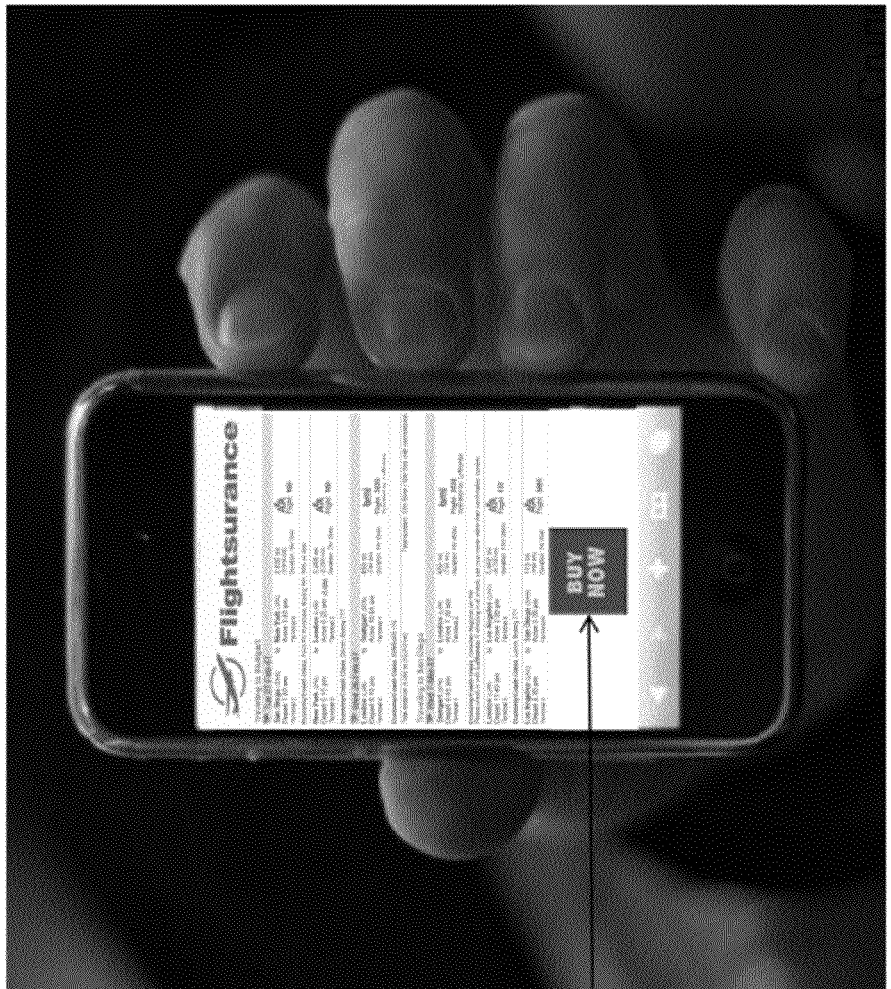
FIG. 6 illustrates purchasing flight accident insurance through a mobile phone.

FIG. 6 illustrates an exemplary layout of a flight accident insurance policy offer 600 on a hand held device, such as an iPhone. The traveler sends the application information to the agent by activating the Buy Now button 602.

Risk Premium Calculation

Once an agent receives application information from a traveler and availability of coverage is confirmed, the agent must calculate the Risk Premium for the Traveler. Table 1 illustrates an exemplary method for calculating the average Risk Premium for flight accident insurance.

TABLE 1

Risk Premium Calculations

| Overall Accidents | Value | |
|---|---|---|
| Number of passengers (USA + Europe + Asia) | 1,850,000,000 | |
| Average number of casualties | 318 | |
| Average casualty rate | 0.000017% | |
| Average Losses | | |
| Insurance coverage per insured | $ | 1,000,000 |
| Average losses per insured | $ | 0.17 |
| Number of insured passengers | | 6,000,000 |
| Average number of insured deaths | | 1.03 |
| Average total claims paid | $ | 1,030,000 |
| Catastrophic Losses (No limit on number of insured per flight) | | |
| Maximum number of insured per flight | | 300 |
| Catastrophic losses for maximum number | $ | 300,000,000 |
| Catastrophic loss per insured | $ | 50.00 |
| Catastrophic Losses (Limited number of insured per flight) | | |
| Maximum number of insureds per flight | | 20 |
| Catastrophic losses for maximum number | $ | 20,000,000 |
| Catastrophic losses per insured | $ | 3.33 |

There are typically 1.85 billion passengers on scheduled airline flights in USA, Europe and Asia in a given year. Each time a person takes off and lands it counts as one "passenger". If a single person takes two flights, for example, it counts as two passengers. The average number of airline casualties due to accidents each year is about 318. The average casualty rate, therefore, is 0.000017% (i.e. 318/1,850,000,000 expressed as a percent).

One method of estimating the Risk Premium is to set it equal to the average losses per insured. The average losses per insured is equal to the casualty rate times the insurance coverage. If the insurance coverage is $1,000,000, then the average losses per insured is $0.17. The total number of claims would be equal to the number of insureds times the casualty rate. If there were 6,000,000 policies sold per year, then the average number of insured casualties would be about 1. The total claims paid would be about $1,000,000.

As indicated above, however, an insurance company must not only be able to pay the average losses, it must also be able to pay the catastrophic losses. A catastrophic loss is a rare but very severe event. Table 1 goes on to show what the catastrophic losses might be if everyone on a large jet (e.g. 300 passengers) had insurance and that jet crashed with all insured passengers perishing. That single loss would be $300,000,000. Spread out over 6,000,000 insureds, the associated Risk Premium would be $50. This is comparable to what current flight accident insurance policies cost.

In the current invention, however, the total number of insureds per flight is limited to a small number, such as 20. Table 1 goes on to show what the catastrophic losses would be if the number of insureds per flight is limited to 20. The total loss would be $20,000,000. The loss spread out over 6,000,000 insureds would be $3.33. This is much less than what current flight accident insurance policies cost and illustrates how this insurance can be priced much lower than currently available coverages while still retaining the ability to cover catastrophic losses.

A more refined method of calculating catastrophic losses employs the multinomial distribution. With the multinomial distribution, one assumes that the probability of any given insured perishing is independent of the probability of any other insured perishing. This assumption becomes reasonable by virtue of the present invention's limitation on the number of insureds on any given flight. Table 2 illustrates the result of a multinomial calculation.

TABLE 2

Catastrophic Losses based on Multinomial Distribution

| Parameter | Value | |
|---|---|---|
| Probability of a given passenger dying | | 0.000017% |
| Number of insured passengers | | 6,000,000 |
| Insurance coverage per passenger | | $1,000,000 |
| Average number of insured deaths | | 1.03 |
| Standard deviation of insured deaths, $\sigma$ | | 1.01 |
| Z(90% confidence interval) | | 1.28 |
| Maximum number of insured deaths (90% confidence interval) | | 2.35 |
| Catastrophic losses for maximum number | $2,350,000 | |
| Catastrophic losses per insured | $ | 0.39 |

The assumptions are that the probability of a given passenger dying in a given year is 0.000017%, that there are 6,000,000 insured passengers per year and the coverage for each insured passenger is $1,000,000.

The average number of insured deaths per year, therefore, is 1.03. The multinomial distribution, however, dictates that in some years the number of deaths will be more (e.g. 2, 3, 4 etc.) and in some years less (e.g. 0). A measure of the variability in this number is the "standard deviation" of the distribution. The standard deviation is a function of the probability of a given death and the total number of passengers that are exposed to the risk. When the probability of a risk is low and the number exposed to the risk is high, then the standard deviation turns out to be approximately equal to the square root of the average number of deaths per year (i.e. $\sigma=1.01=\text{sqrt}(1.03)$). A typical range of expected values of the number of deaths per year, therefore would be between 0 and 2 for an average of 1.

For estimating catastrophic losses, however, we want to go beyond a typical range of losses to a maximum range of losses. Multinomial statistics indicate that for a "90% confidence interval", the maximum number of insured deaths is equal to the average plus 1.28 times the standard deviation. By 90% confidence interval, it is meant that 90% of the time, in any given year, the number of casualties will be at or below the indicated maximum level. The number 1.28 comes from the value of the "Z" parameter for a cumulative distribution of 90%. Thus in this case, the maximum number of insured deaths would be 2.35. The catastrophic losses therefore would be $2,350,000. The catastrophic losses per insured and associated Risk Premium would be $0.39. This number can be adjusted on a present-value basis to take into account the discount rate between when the premium is collected and when a claim is paid. The overall equation for the Risk Premium then becomes:

$$P^* = \frac{d(\mu + Z_{(1-\alpha)} \cdot \sigma)(e^{-\gamma})}{n}$$

Where P* is the Risk Premium per insured, d is the coverage per insured, n is the number of insureds, $\mu$ is the average number of insured deaths per year, $Z_{(1-\alpha)}$ is the Z parameter for the 90% confidence interval (i.e. $\alpha=0.1$), $\sigma$ is the standard deviation of the number of casualties per year and $\gamma$ is the "time value of money" discount for the period from when the premium is received to when the claim is paid. For a discount rate of 5% per year and a period between premium payment and claim payment of one month, $\gamma=0.0042$. The Risk Premium calculated according to said equation represents a minimum Risk Premium. A higher total premium may be charged according to the requirements of the marketplace, such as the desirability of offering a single fixed price.

Airline Effects on Risk Premium

Different airlines have different safety records. The Risk Premium therefore, can be adjusted for different airlines. A simple and effective method for adjusting for different airlines is to adjust the Risk Premium according to the average GDP in the country that an airline is domiciled in. The premise is that countries with higher GDPs will have newer planes that are better maintained with more strict safety procedures and better training programs. Hence their risk of crashes will be lower.

Table 3 presents exemplary Insurance Ratings and associated Risk Premiums as a function of the GDP of the country that an airline is from. The Risk Premiums increase with decreasing GDP until a lower threshold is reached. When a country's GDP is below the lower threshold (e.g. $1,000), then the insurance carrier may elect to not provide coverage (i.e. the airline is "not insurable").

Alternatively, for lower grade airlines (e.g. C-F), the maximum number of seats that can be insured on a flight might be reduced. A "C" grade, for example, may have a maximum number of insureds per flight of 10 instead of 20.

A sliding scale of Risk Premiums versus number of insurance policies sold per flight may alternatively be provided. The first 10 seats may have the standard Risk Premium, but the next ten may have a larger Risk Premium to reflect the higher catastrophic risk exposure. The sliding scale for Risk Premiums may also be applied to higher rated airlines (e.g. A and B).

TABLE 3

| Country GDP | Insurance Rating | Risk Premium |
| --- | --- | --- |
| $34,000 < X | A | $0.30 |
| $24,000 < X ≤ $34,000 | A- | $0.60 |
| $14,000 < X ≤ $24,000 | B | $2.10 |
| $9,000 < X ≤ $14,000 | B- | $2.40 |
| $4,000 < X ≤ $9,000 | C | $2.70 |
| $2,000 < X ≤ $4,000 | C- | $3.00 |
| $1,000 < X ≤ $2,000 | D | $3.30 |
| X ≤ $1,000 | F | Not insurable |

Airline specific adjustments can be made to the GDP based Insurance Rating. Many airlines, for example, belong to an airline alliance. Airline alliances include Star Alliance, Sky Team and oneworld. Airline partners in an alliance may have their insurance rating increased a third of a step relative to their GDP rating by virtue of the fact that their safety standards must conform to the higher standards of their alliance. An airline that had a GDP based Insurance Rating of A-, for example, might have its rating increased to an A if it belonged to an alliance.

If a given flight is offered by multiple airlines each with their own flight designation, then the Risk Premium for the flight is set according to the airline that is the operating carrier. If the operating carrier is unknown, then the Risk Premium is set according to which airline has the lowest insurance rating.

Reinsurance

The insurance carrier need not bear all of the catastrophic risk. At least a portion of the catastrophic risk, such as 30% to 90%, may be ceded to a reinsurer. For example, if a carrier was exposed to a $20,000,000 per year catastrophic risk, it might cede $10,000,000 of the risk to a reinsurance carrier and retain $10,000,000 of the risk itself. The annual reinsurance premium might be 5% of the coverage ($500,000). Reinsurance can allow a carrier to sell more policies per plane. Up to 30 policies may be sold at a reasonable reinsurance premium.

Adjustments to Risk Premium to get Final Premium

The Risk Premium may be adjusted according to the specific itinerary of a given traveler. If a traveler books more than one flight for a given itinerary, then the total Risk Premium for the itinerary will be equal to the sum of the Risk Premiums for each flight. This is because the risk of crashing is proportional to the number of takeoffs. About 95% of all crashes occur on takeoff or landing.

Additional Risk Premium may be charged for flights originating in one continent or region and terminating in another continent or region. Continents and regions include Europe, Africa, Asia, Australia, Oceania, North America, South America, and Greenland. The addition to the Risk Premium might be $1.

A fixed cost of insurance may be added to the total Risk Premium for all flights in an itinerary. An exemplary fixed cost might be $2.

Finally a gross margin is added to the adjusted Risk Premium to calculate the final premium that will be offered to the Traveler. A suitable gross margin may be in the range of 60%-70%. Gross margin may include commissions, profit and taxes.

Fixed Price Structure

It may be convenient to offer the insurance with a fixed price structure. A suitable fixed price structure comprises a first fixed price, a second fixed price and a variable price. A suitable level for the first fixed price is $6.99. A suitable level for the second fixed price is $9.99. These can be adjusted according to experience and inflation.

If the calculated final premium for a traveler traveling one way is between 0 and the first fixed price, then the coverage is offered at the first fixed price. If the final premium is greater than the first fixed price, then the coverage is offered at the calculated final premium.

If a traveler has two takeoffs in an itinerary and the scheduled takeoff of the second flight is no more than 24 hours after the scheduled arrival of the first flight (e.g. a connecting flight), then both flights are considered a single one way flight. For example, if the first flight has a calculated premium of $1 and the second flight has a calculated premium of $2, then the premium charged will be the first fixed price, $6.99. If, however the second takeoff is more than 24 hours later than the first arrival, then each flight is considered a one way flight and the premium charged will be the sum of two first fixed prices, $13.98 ($6.99+$6.99).

If a traveler is traveling round trip, then the minimum premium will be the second fixed price. Thus, if a final premium for a one way trip is calculated to be $2, then the roundtrip fixed price will be $9.99. "Round trip" can also be defined as any itinerary of three or more takeoffs or any itinerary that includes a two or more landing at the same airport.

Particular Machine for Implementation

Figure 7:
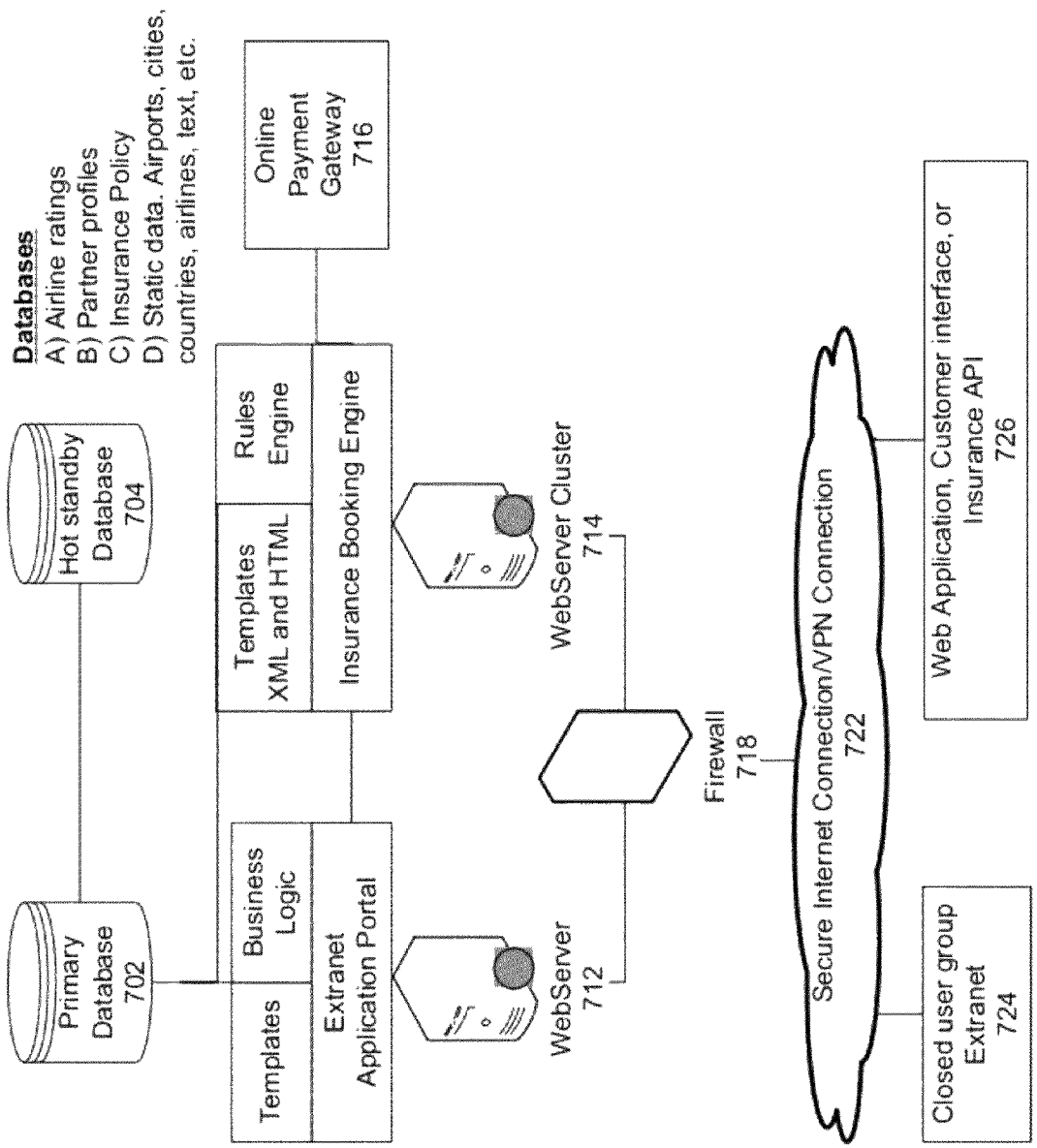
FIG. 7 illustrates a particular machine for providing insurance coverage.

FIG. 7 illustrates a particular machine or system for providing insurance coverage. The system comprises a Primary Database 702 and a Hot Standby Database 704. These databases may be physically housed on database servers, in a secure hosting environment. The servers, such as Dell PowerEdge Servers, required for the online transaction process, may have speeds and capacities comparable to airline reservation systems.

The databases housed on said database servers comprise airline insurability ratings, partner profiles, insurance policy, and "static data", such as airports, cities, countries, airlines and text. Dynamic data, such as airline flight designations, are updated periodically, such as daily. Real time data, such as actual flight insurance policies sold, and the number of available policies on a given flight, are updated in real time.

The Hot Standby Database is updated in real time so that it can be immediately available should the Primary Database crash.

The hardware for presenting information to a potential insured, receiving information from said potential insured, calculating an underwriting decision, calculating a premium, receiving payment and binding coverage comprises a Web Server 712 and a Web Server Cluster 714.

The Web Server executes relatively low computationally intensive activities, such as Templates, Business Logic and Extranet Portal Applications. The Web Server Cluster executes relatively high computationally activities, such as XML and HTML templates, rules engines and in particular, the insurance booking engine. The Web Server Cluster may also communicate with an Online Payment Gateway 716 for processing payments.

The Web Servers communicate to the Internet 722 through an appropriate firewall 718. Said firewall represents a specific modification to said server such that said insurance can be offered securely. A potential insured might communicate through a Closed User Group Extranet 724 (e.g. a travel agency) or through a Web Application 725 (e.g. easyjet.com) or mobile application.

The speeds and capacities of the computational systems are scalable. As the user base grows, the capacity grows approximately proportionally above a certain minimum overhead.

Insurance Regulation

One of skill in the art will recognize that insurance is a regulated industry. One practicing the methods described and claimed herein will want to maintain compliance with all applicable local, state and federal regulations, to ensure that the insurance policy is properly presented to the insured, premiums are properly approved, underwriting properly occurs, all necessary regulatory approvals are in place, etc.

Conclusion

While particular embodiments of the present invention have been illustrated and described, it would be obvious to those skilled in the art that various other changes and modifications can be made without departing from the spirit and scope of the invention. Any of the aspects of the present invention found to offer advantages over the state of the art may be used separately or in any suitable combination to achieve some or all of the benefits of the invention disclosed herein.

The invention claimed is:
1. A system for providing flight accident insurance to a traveler, said system comprising:
 a. a computer configured to accept an application for said flight accident insurance from said traveler, said application comprising a listing of a flight on said traveler's itinerary, said flight being operated by an operating carrier;
 b. a computer configured to query a flight database to determine if flight accident insurance is available for said flight, said availability being confirmed if there is less than a first number of said flight accident insurance policies already sold to other travelers for said flight;
 c. a computer configured to receive confirmation of the availability of said flight accident insurance for said traveler;
 d. a computer configured to calculate a premium for said flight accident insurance, said calculation being based on the GDP of the country in which said operating carrier is domiciled such that said premium is a decreasing function of said GDP; and
 e. a computer configured to provide said premium and an offer of coverage to said traveler.

2. The system of claim 1 wherein said first number is 20.
3. The system of claim 1 wherein one or more of said computers is a database server.
4. The system of claim 1 wherein said computer configured to calculate said premium is further configured to calculate a minimum Risk Premium according to the equation:

$$P^* = \frac{d(\mu + Z_{(1-\alpha)} \cdot \sigma)(e^{-\gamma})}{n}$$

where P* is the Risk Premium per insured, d is the coverage per insured, n is the number of insureds, μ is the average number of insured deaths per year, $Z_{(1-\alpha)}$ is the Z parameter for a confidence interval of (1−α), σ is the standard deviation of the number of casualties per year and $\gamma$ is the time value of money discount for the period from when the premium is received to when a claim is paid.

5. The system of claim 4 wherein $(1-\alpha)$ is 90% and wherein $Z_{(1-\alpha)}$ is the Z parameter for a multinomial distribution.

6. The system of claim 1 which further comprises a Web Server and a Web Server Cluster wherein said Web Server is configured to serve as an extranet application portal and said Web Server cluster is configured to serve as an insurance booking engine such that said premium and said offer of coverage can be provided in real time to said traveler.

7. The system of claim 1 wherein said flight database comprises a listing of all airlines offering said flight such that said number of policies already sold is the sum of all policies sold to travelers booking under each of said airlines.

8. The system of claim 7 wherein different airlines and different flight numbers are considered to refer to the same flight if:
   a. the different airlines belong to the same airline alliance;
   b. the departure airports and arrival airports are the same for each of the different airlines and different flight numbers; and
   c. the departure times are within 5 minutes of each other.

9. The system of claim 1 which further comprises a computer configured to update said number of policies sold for a given flight after an insurance policy is issued such that conflicts due to simultaneous bookings by more than one traveler are prevented.

10. The system of claim 1 which further comprises a computer configured to cede a portion of the risk of said insurance policies to a reinsurer and wherein said portion is 90% or greater.

11. The system of claim 1 wherein said computer configured to provide said premium and an offer of coverage to said traveler comprises one or more of a workstation in communication with the Internet, or a mobile device.

12. A method for offering flight accident insurance to a traveler, said method comprising the steps of:
   a. accepting in a computer an application for said flight accident insurance from said traveler, said application comprising a listing of a flight on said traveler's itinerary, said flight being operated by an operating carrier;
   b. querying by a computer a flight database to determine if flight accident insurance is available for said flight, said availability being confirmed if there is less than a first number of said flight accident insurance policies already sold to other travelers for said flight;
   c. receiving in a computer confirmation of the availability of said flight accident insurance for said traveler;
   d. calculating by a computer a premium for said flight accident insurance, said calculation being based on the GDP of the country in which said operating carrier is domiciled such that said premium is a decreasing function of said GDP; and
   e. providing by a computer said premium and an offer of coverage to said traveler.

13. The method of claim 12 wherein said premium is a fixed premium.

14. The method of claim 12 which further comprises the steps of:
   a. calculating a minimum Risk Premium based on the multinomial distribution of the number of insured deaths per year;
   b. calculating a final premium based on said minimum Risk Premium and the fixed costs of providing said insurance; and
   c. setting said premium equal to said final premium if said final premium is greater than a fixed premium.

15. The method of claim 14 wherein said flight comprises two connecting flights and wherein said final premium is calculated based on the sum of the calculated final premiums of each of said connecting flights.

\* \* \* \* \*